United States Patent
Bopardikar et al.

(10) Patent No.: US 10,127,495 B1
(45) Date of Patent: Nov. 13, 2018

(54) REDUCING THE SIZE OF A NEURAL NETWORK THROUGH REDUCTION OF THE WEIGHT MATRICES

(71) Applicants: Rohan Bopardikar, Los Altos Hills, CA (US); Sunil Bopardikar, Los Altos Hills, CA (US)

(72) Inventors: Rohan Bopardikar, Los Altos Hills, CA (US); Sunil Bopardikar, Los Altos Hills, CA (US)

( * ) Notice: Subject to any disclaimer, the term of this patent is extended or adjusted under 35 U.S.C. 154(b) by 58 days.

(21) Appl. No.: 15/488,385

(22) Filed: Apr. 14, 2017

(51) Int. Cl.
*G06N 3/08* (2006.01)
*G06F 1/32* (2006.01)
*G06K 9/00* (2006.01)

(52) U.S. Cl.
CPC ............ *G06N 3/08* (2013.01); *G06F 1/32* (2013.01); *G06K 9/00288* (2013.01)

(58) Field of Classification Search
None
See application file for complete search history.

(56) References Cited

U.S. PATENT DOCUMENTS

| | | | | |
|---|---|---|---|---|
| 2014/0372112 | A1* | 12/2014 | Xue | G10L 15/16 704/232 |
| 2015/0170020 | A1* | 6/2015 | Garimella | G06N 3/082 706/14 |
| 2016/0328643 | A1* | 11/2016 | Liu | G06N 3/084 |
| 2017/0193368 | A1* | 7/2017 | Le Grand | G06N 3/084 |

OTHER PUBLICATIONS

Blyumin, Sam L., and Paul V. Saraev. "Reduction of adjusting weights space dimension in feedforward artificial neural networks training." Artificial Intelligence Systems, 2002.(ICAIS 2002). 2002 IEEE International Conference on. IEEE, 2002.*

Han, Song, Huizi Mao, and William J. Daily. "Deep compression: Compressing deep neural networks with pruning, trained quantization and huffman coding." arXiv preprint arXiv:1510.00149 (2015).*

Hinton, Geoffrey E., and Ruslan R. Salakhutdinov. "Reducing the dimensionality of data with neural networks." science313.5786 (2006): 504-507.*

* cited by examiner

*Primary Examiner* — Kakali Chaki
*Assistant Examiner* — Daniel Pellett
(74) *Attorney, Agent, or Firm* — Elliot H. Karlin; Hickman Palermo Becker Bingham LLP

(57) ABSTRACT

Systems and methods for reducing the size of deep neural networks are disclosed. In an embodiment, a server computer stores a plurality of training datasets, each of which comprise a plurality of training input matrices and a plurality of corresponding outputs. The server computer initiates training of a deep neural network using the plurality of training input matrices, a weight matrix, and the plurality of corresponding outputs. While the training of the deep neural network is being performed, the server computer identifies one or more weight values of the weight matrix for removal. The server computer removes the one or more weight values from the weight matrix to generate a reduced weight matrix. The server computer then stores the reduced weight matrix with the deep neural network.

18 Claims, 6 Drawing Sheets

REDUCING THE SIZE OF A NEURAL NETWORK THROUGH REDUCTION OF THE WEIGHT MATRICES

FIELD OF THE DISCLOSURE

The technical field of the disclosure generally relates to computer hardware, software, and systems that implement communications between client computing devices and server computers. The technical field of the disclosure also is computer hardware, software, and systems that are programmed or configured to generate, train, and process input data using neural networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

It is difficult to program a computer to solve a wide array of different problems without first providing the algorithms for solving each problem type. For example, classifying large amounts of data traditionally would require initially identifying every category and identifying each algorithm that can be used to prioritize categories based on input information.

Manually programming every algorithm can be extremely cumbersome. For instance, in categorizing data, a rule would need to be programmed into the computer for each type of priority. Additionally, manually programming solutions to complex problems is only useful if the problem has been seen before. The manually programmed algorithms are unable to categorize information that is not described in any of the algorithms.

Neural networks provide an elegant solution to the difficulties of solving complex problems. Neural networks generally contain set algorithms and a plurality of weight values. The weight values are multiplied by the algorithms and any input data to generate a result. As a neural network is trained, the weights are adjusted so that the computations performed with training data yield the correct results. Neural networks have found utility in various kinds of data analysis systems, voice recognition, document recognition, image recognition, recommendations systems and other applications of artificial intelligence.

A major benefit of neural networks is that they learn inherent patterns in different datasets. Thus, the programmer does not have to know the correct algorithm prior to programming the neural network for the neural network to provide an accurate result. Additionally, the fact that the neural network picks up patterns in existing data allows the neural network to provide solutions for problems that had not been considered prior to programming of the neural network.

While neural networks provide a large benefit in solving complex problems, they do so at a high computational cost. Both the training of the neural network and the processing of data through a neural network requires a large amount of power and memory primarily due to multiplication of large matrices. Each time a training dataset or an input dataset is processed, a large weight matrix must be retrieved from memory and multiplied by other large matrices.

Due to the high computation and storage costs of neural network use, most neural networks are stored on and utilized by server computers. The storage, retrieval, transmission, and multiplication of large matrices tend to require better graphics cards and memory than are generally available on low power devices, such as smartphones and tablet computers. If a user of a low power device wishes to utilize a neural network, the user generally must send the input data to a server computer and wait for the server computer to produce an output. In some cases, this interchange occurs using background messaging processes over networks so that the user of a client computer or mobile computing device may be unaware that transfers to the server are occurring.

However, the restriction of neural networks to server computers greatly decreases their usefulness. Neural networks on low power devices can be extremely useful for image recognition, speech-to-text, providing recommendations to users and other applications that are not yet conceived or developed. Yet if the load of processing the input data with the neural network is too high, then a client computing device must be capable of interfacing with a server computer for use of the neural network and must be dependent on the server computer to provide the requested outputs. Ample processing power, and/or an active network connection to a server, typically are required.

Thus, there is a need for a technique that reduces the memory usage of storing a neural network on a client computing device and reduces the computational cost of processing data using the neural network. Reducing these costs would benefit the client computing device by allowing the client computing device to run the neural network without being dependent on a server computer. There is an acute need for techniques that offer improved computation efficiency to make executing neural networks, and related applications, using mobile computing devices a reality.

SUMMARY

The appended claims may serve as a summary of the disclosure.

DETAILED DESCRIPTION

Figure 1:
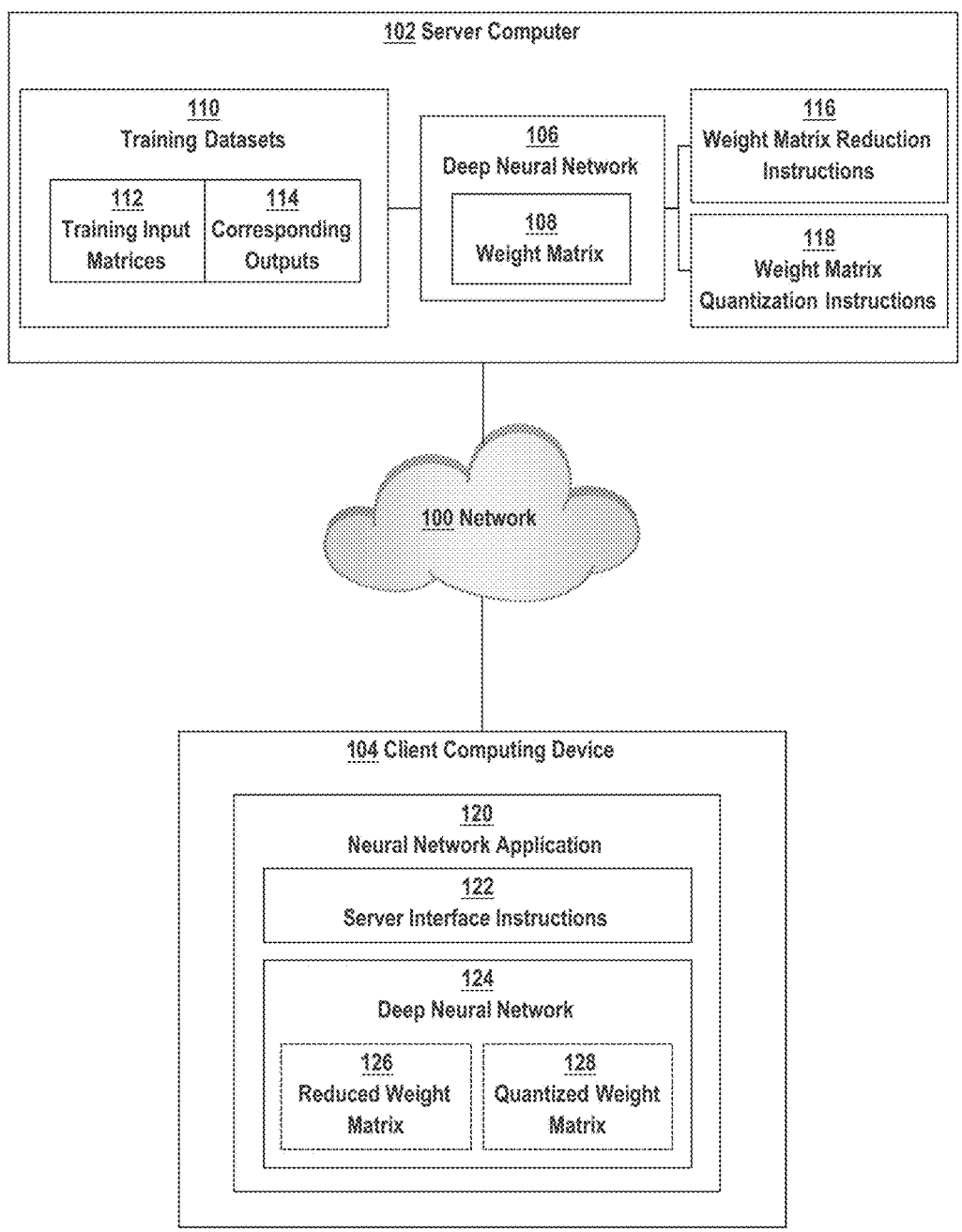
FIG. 1 depicts an example system in which the techniques described may be implemented according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are disclosed in sections according to the following outline:

1. GENERAL OVERVIEW
2. SYSTEM OVERVIEW
3. REMOVING VALUES FROM A WEIGHT MATRIX
4. REPLACING VALUES IN A WEIGHT MATRIX
5. BENEFITS OF CERTAIN EMBODIMENTS
6. HARDWARE OVERVIEW

1. General Overview

Systems and methods for reducing the size of a weight matrix through removal of values are described herein. According to an embodiment, a server computer uses training datasets comprising inputs and corresponding outputs to train a neural network. As the neural network is trained, the server computer identifies values in the weight matrix for removal. The server computer removes the identified values to produce a reduced weight matrix and stores the reduced weight matrix as part of the neural network. The server computer may then send the reduced weight matrix to a client computing device for use in a neural network and/or use the reduced weight matrix to increase the server computer's efficiency in processing data through a neural network.

Systems and methods for reducing the size of a weight matrix through quantization of values are described herein. According to an embodiment, a server computer identifies a first value in a trained weight matrix, a second value in the trained weight matrix, and a plurality of values between the first value and the second value. The server computer assigns an integer to each identified value. For every weight value in the weight matrix, the server computer identifies a closest value of the identified values, identifies an integer assigned to the closest value, and replaces the weight value with the identified integer. The server computer may then send the quantized weight matrix to a client computing device for use in a neural network.

In an embodiment, a method comprises, using a server computer, storing a plurality of training datasets, each of which comprising a plurality of training input matrices and a plurality of corresponding outputs; using the server computer, initiating training of a deep neural network using the plurality of training input matrices, a weight matrix, and the plurality of corresponding outputs; while performing the training of the deep neural network, identifying one or more weight values of the weight matrix for removal; removing the one or more weight values from the weight matrix to generate a reduced weight matrix; storing the reduced weight matrix.

In an embodiment, a method comprises, using a server computer, storing a plurality of training datasets, each of which comprising a plurality of training input matrices and a plurality of corresponding outputs; using the server computer, training a deep neural network using the plurality of training input matrices, a weight matrix, and the plurality of corresponding outputs; after training the neural network, identifying, in the weight matrix, a first weight value and a second weight value; identifying a plurality of values between the first weight value and the second weight value; assigning different integer values to each of the first weight value, the second weight value, and the plurality of values; generating a quantized weight matrix by performing, for each weight value of the weight matrix: identifying a particular value of the first weight value, the second weight value, and the plurality of values that is closest in magnitude to the weight value; identifying a particular integer assigned to the particular value; replacing the weight value with the particular integer.

2. System Overview

FIG. 1 depicts an example system in which the techniques described may be implemented according to an embodiment. In the example of FIG. 1, a server computer 102 and a client computing device 104 are communicatively coupled to a data communications network 100. The network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 102, client computing device 104, and other elements of the system may each comprise an interface compatible with the network 100 and are programmed or configured to use standardized protocols for communication across the networks such as TCP/IP, Bluetooth, and higher-layer protocols such as HTTP, TLS, and the like.

Server computer 102 may be implemented using a server-class computer or other computers having one or more processor cores, co-processors, or other computers. Server computer 102 may be a physical server computer and/or a virtual server instance stored in a data center, such as through cloud computing. The server computer 102 may be programmed or configured to generate and train a deep neural network. The server computer may comprise a plurality of communicatively coupled server computers including a server computer for training the neural network and a server computer for communicating with a client computing device. Server computer 102 stores training datasets 110, deep neural network 106, weight matrix reduction instructions 116, and weight matrix quantization instructions 118.

Training datasets 110 comprise datasets for training a deep neural network. Training datasets 110 comprise training input matrices 112 and corresponding outputs 114. Training input matrices 112 comprise data elements that function as raw inputs to a neural network. Corresponding outputs 114 comprise data elements that correspond to the data elements of training input matrices 112. For example, a particular training input matrix may include pixel values representing one or more frequencies of pixels in an image while a corresponding output to the particular training input matrix may include a classification of the image. Thus, each of the training input matrices correspond to at least one corresponding output. The corresponding outputs may be manually determined and verified through use of one or more algorithms and/or prior usage of the deep neural network.

Server computer 102 uses training datasets 110 to train a deep neural network 106. The deep neural network comprises a weight matrix which is used to produce outputs from input matrices. The weight matrix comprises a plurality of values which are adjusted as the deep neural network is trained. A deep neural network may comprise a plurality of weight matrices. For example, a multiple layer neural network may comprise a weight matrix for each layer of the neural network.

Training the neural network generally comprises a feedback loop wherein the neural network is used to compute an output for a training input matrix. After producing an output, the produced output is compared to the corresponding output for the training input matrix. If the corresponding output matches the produced output, the neural network proceeds to the next training dataset. If the outputs do not match, then the values of the weight matrix are adjusted to reduce the difference between the produced output and the corresponding output, such as through stochastic gradient descent. The deep neural network is then used again to produce an output for the training input matrix. The process continues with the training input matrix until the corresponding output matches the produced output.

Server computer 102 additionally stores weight matrix reduction instructions 116 and weight matrix quantization instructions 118. Weight matrix reduction instructions 116 and weight matrix quantization instructions 118 each comprise a set of one or more pages of main memory, such as RAM, in a server computer into which executable instructions have been loaded and which when executed cause the master neural network server computer to perform the functions or operations that are described herein with reference to those modules. For example, the weight matrix reduction instructions 116 may comprise a set of pages in RAM that contain instructions which when executed cause the server computer 102 to perform a method for reducing the storage size of a weight matrix, such as the example method described in FIG. 2.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, weight matrix reduction instructions 116 and weight matrix quantization instructions 118 also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer 102.

Client computing device 104 is a computer that includes hardware capable of communicatively coupling client computing device 104 to one or more server computers, such as server computer 102 over one or more service providers. For example, client computing device 104 may include a network card that communicates with server computer 102 through a home or office wireless router (not illustrated in FIG. 1) couple to an internet service provider. Client computing device 104 may be a smart phone, personal computer, tablet computing device, PDAs, laptop, or any other computing device capable of transmitting and receiving information and performing the functions described herein.

Client computing device 104 stores a neural network application 120. Neural network application 120 may be any software application that utilizes a neural network. Different types of neural network applications may include speech recognition software, image classification software, recommendation engines, language translation applications, and the like. Neural network application 120 may utilize a deep neural network in order to provide an output to the neural network application. For example, speech recognition software may utilize a neural network to parse spoken words and produce an output of written words. The neural network application 120 may be provided by server computer 102 over network 100.

Neural network application 120 comprises server interface instructions 122. Server interface instructions comprise computer readable instructions which, when executed by one or more processors, cause the client computing device to interact with server computer 102. The server interface 122 may cause the client computing device 104 to download deep neural network 124 from server computer 102 over network 100. Additionally, server interface instructions 122 may include instructions for sending data to server computer 102 for use in further training the deep neural network.

Neural network application 120 further comprises deep neural network 124. Deep neural network 124 is a deep neural network received from server computer 102. Deep neural network 124 may differ from deep neural network 106 in the stored weight matrices. Additionally, deep neural network 106 may be continuously updated with new training datasets, thereby differentiating deep neural network 106 from deep neural network 124. Deep neural network 124 may be stored in on-disk storage, such as static random access memory (SRAM) of the client computing device 104.

Deep neural network 124 may store one or more of reduced weight matrix 126 or quantized weight matrix 128. Reduced weight matrix comprises a weight matrix that has been reduced by server computer 102 using weight matrix reductions instructions 116. Quantized weight matrix 128 comprises a weight matrix that has been quantized by server computer 102 using weight matrix quantization instructions 118. In an embodiment, the quantized weight matrix 128 has also been reduced by server computer 102 using weight matrix reduction instructions 116.

FIG. 1 depicts server computer 102 and client computing device 104 as distinct elements for the purpose of illustrating a clear example. However, in other embodiments, more or fewer server computers may accomplish the functions described herein. For example, a plurality of client computing devices may connect to the server computer 102. As another example, an embodiment may be practiced with server computer 102 performing both the training and the running of the neural network. Additionally, server computer 102 may comprise a plurality of communicatively coupled server computers including a server computer for training the neural network and a server computer for communicating with a client computing device.

3. Removing Values from a Weight Matrix

In an embodiment, a server computer removes values from a weight matrix of a neural network in order to reduce the size of the weight matrix, thereby decreasing processing power required to compute outputs using the weight matrix. The server computer may utilize regularization techniques to reduce the magnitude of weights in the deep neural network. For example, the server computer may add a regularization term to the cost function for the neural network. An example of a cost function using a regularization term is as follows:

$$C = C_0 + \frac{\lambda}{2n} \sum_w w^2$$

where $C_0$ is a general cost function, µ is a regularization parameter which, when increased, generates a preference for smaller weights, n is the size of the training dataset, and w represents the weights in the weight matrix. Using a function such as the function described above, the server computer may adjust the weight matrix to prefer smaller weights.

In an embodiment, the server computer uses the preference for smaller weights to remove values from the weight matrix. For example, the server computer may store and/or compute a threshold value. Each weight value below the threshold value may be removed from the weight matrix or set to zero. The threshold value may be stored in advance and/or computed based on the weight values in the weight matrix. For example, the threshold value may be computed as a fraction of the highest weight values in the weight matrix.

By removing the lowest weight values from the weight matrix and/or setting the weight values to zero, the neural network server computer saves space in storing the weight matrix. For example, instead of storing a negligible value which uses thirty two bits of storage, the server computer may store a null value which only uses one or two bits of storage, thereby significantly decreasing the storage space required for storing the weight value. Additionally, given a sparse weight matrix, removing low values from the matrix saves on a large amount of space due to the reduction of memory usage for many values.

Figure 2:
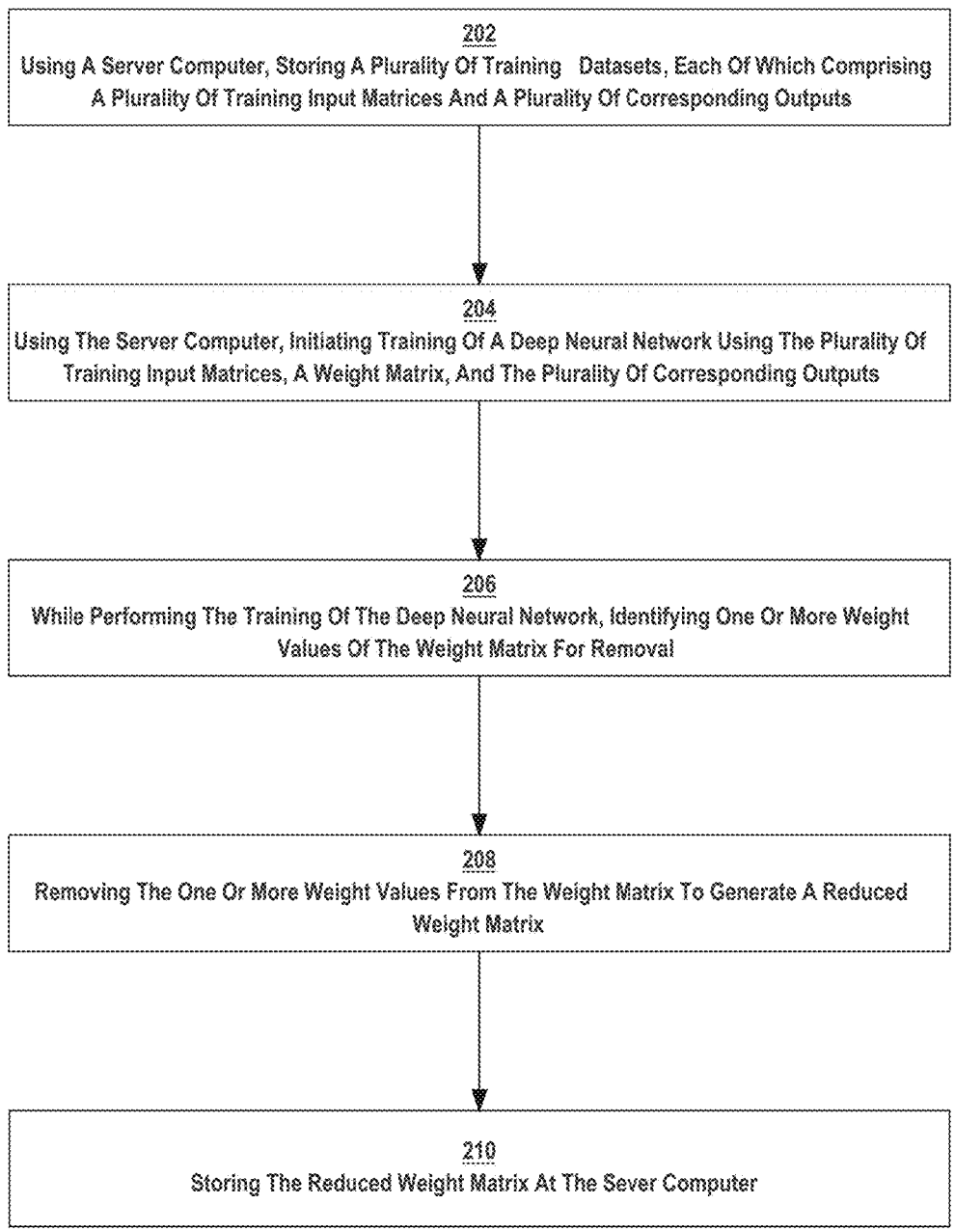
FIG. 2 depicts an example method of a server computer reducing the storage size of a deep neural network.

FIG. 2 depicts an example method of a server computer reducing the storage size of a deep neural network.

At step 202, a plurality of training datasets, each of which comprising a plurality of training input matrices and a plurality of corresponding outputs are stored using a server computer. The training input matrices may comprise a plurality of values representing inputs. For example, data representing a sequence of words may be stored as a vector of values. Each input may be associated with a corresponding output. For example, a first vector of values representing a sequence of words may correspond to a second vector of values representing a classification.

In an embodiment, the training datasets are provided by one or more client computing devices. For example, a client computing device may upload a training dataset comprising all prior inputs and verified outputs for the type of problem being solved by the neural networks. Additionally or alternatively, the training datasets may be provided by a plurality of different client computing devices. For example, a plurality of client computing devices may each identify correct outputs for different inputs and sent them to the server computer. The server computer may aggregate the inputs and corresponding outputs into training datasets.

At step 204, training of a deep neural network using the plurality of training input matrices, a weight matrix, and a plurality of corresponding outputs is initiated using the server computer. For example, the server computer may compute an output of a deep neural network with a default weight matrix using a first training input matrix. If the output of the deep neural network does not match the corresponding output of the first training input matrix, the server computer may adjust the weight matrix, such as by using stochastic gradient descent to slowly adjust the weight matrix over time. The server computer may then re-compute an output from the deep neural network with the input training matrix. This process may continue until the corresponding output matches the computed output. The server computer may then repeat this process for each training input dataset.

At step 206, while the training of the deep neural network is performed, one or more weight values of the weight matrix are identified for removal. For example, the server computer may utilize a regularization parameter in a cost function, such as the one described above, to reduce the size of values in the weight function. The server computer may then identify values in the weight function that are below the stored threshold value for removal.

The regularization parameter is applied as part of the cost function that is used during training. The server computer may monitor values in the weight matrix and being removing values from the weight matrix as they fall below a particular threshold value. Additionally or alternatively, the server computer may wait until a particular point in the training of the neural network to begin removing values from the weight matrix. For example, the server computer may store a second threshold value indicating a number of inputs and corresponding outputs to be processed before the server computer begins removing values from the weight matrix. Thus, the server computer may adjust the weight matrix using a regularization parameter from the initiation of training, but only begin removing values further into the training process.

The server computer may use one or more algorithms for performing the regularization and selection of terms for removal. For example, a least absolute shrinkage and selection operator (LASSO) method may be applied to perform both the regularization functions and selection functions described herein. The LASSO technique includes the minimization of weight values as described with the regularization parameter above while including the ability to set values to zero as part of the minimization. The LASSO technique performs these functions by attempting to solve $$\min_{\beta_0, \beta} \left\{ \frac{1}{N} \sum_{i=1}^{N} (y_i - \beta_0 - x_i^T \beta)^2 \right\} \text{ subject to } \sum_{j=1}^{p} |\beta_j| \leq t$$

where t is the regularization parameter, y includes the outputs, and x includes inputs. The LASSO minimization function may be added to the cost function described above instead of the regularization term. Thus, a new cost function may be defined as:

$$C = C_0 + \frac{1}{N} \sum_{i=1}^{N} (y_i - \beta_0 - x_i^T \beta)^2 \text{ subject to } \sum_{j=1}^{p} |\beta_j| \leq t$$

where N is the number of values in the weight matrix, β is the weight matrix, x are the input training matrices, and y are the corresponding outputs.

In an embodiment, the server computer identifies groups of values to be removed from the weight matrix. For example, the server computer may identify entire columns and/or entire rows of the weight matrix for removal. Thus, a weight matrix may be reduced from including five hundred rows to a weight matrix including fifty-rows. By removing entire rows and/or entire columns, the server computer may reduce the size of the weight matrix, thereby decreasing the processing power required for performing multiplications with the weight matrix. Additionally, the storage cost is decreased when the size of the weight matrix is decreased.

In an embodiment, the server computer identifies columns and/or rows of the weight matrix to remove using group LASSO regularization. Group LASSO regularization works similarly to LASSO regularization in that it performs a minimization of a difference between computed values and output values, but while allowing particular groups of values to be reduced to zero. The group LASSO technique allows groups of values to be reduced to zero by attempting to solve $$\min_{\beta \in R_p} \left\{ \left\| y - \sum_{j=1}^{J} X_j \beta_j \right\|_2^2 + \lambda \sum_{j=1}^{J} \|\beta_j\|_{K_j} \right\}, \|z\|_{K_j} = \sqrt{z^t K_j z}$$

for each of J groups.

The server computer may use individual columns and/or rows as the different groups of values, thereby allowing the server computer to reduce rows and/or columns and then remove the rows and/or columns from the weight matrix. For example, a cost function for the deep neural network may take the form of $$C = C_0 + \left\| y - \sum_{j=1}^{j} X_j \beta_j \right\|_2^2 + \lambda \sum_{j=1}^{J} \|\beta_j\|_{K_j}$$

where y are the corresponding outputs, X are the input training matrices, and each group in J are individual columns and/or rows of the weight matrix. This allows the server computer to minimize values for individual columns and/or rows as a group.

At step 208, the one or more weight values from the weight matrix are removed to generate a reduced weight matrix. For example, the server computer may remove columns and/or rows from the weight matrix which have been reduced to zero or which include values below a particular threshold value. Removing the weight values may include generating a matrix without the removed rows and/or columns instead of setting the values to zero or null values. For example, if a row is removed from a 10×10 matrix, the matrix may be reduced to a 9×10 matrix. If a column is removed from a 10×10 matrix, the matrix may be reduced to a 10×9 matrix. If both a column and a row are removed from a 10×10 matrix, the matrix may be reduced to a 9×9 matrix.

Figure 3:
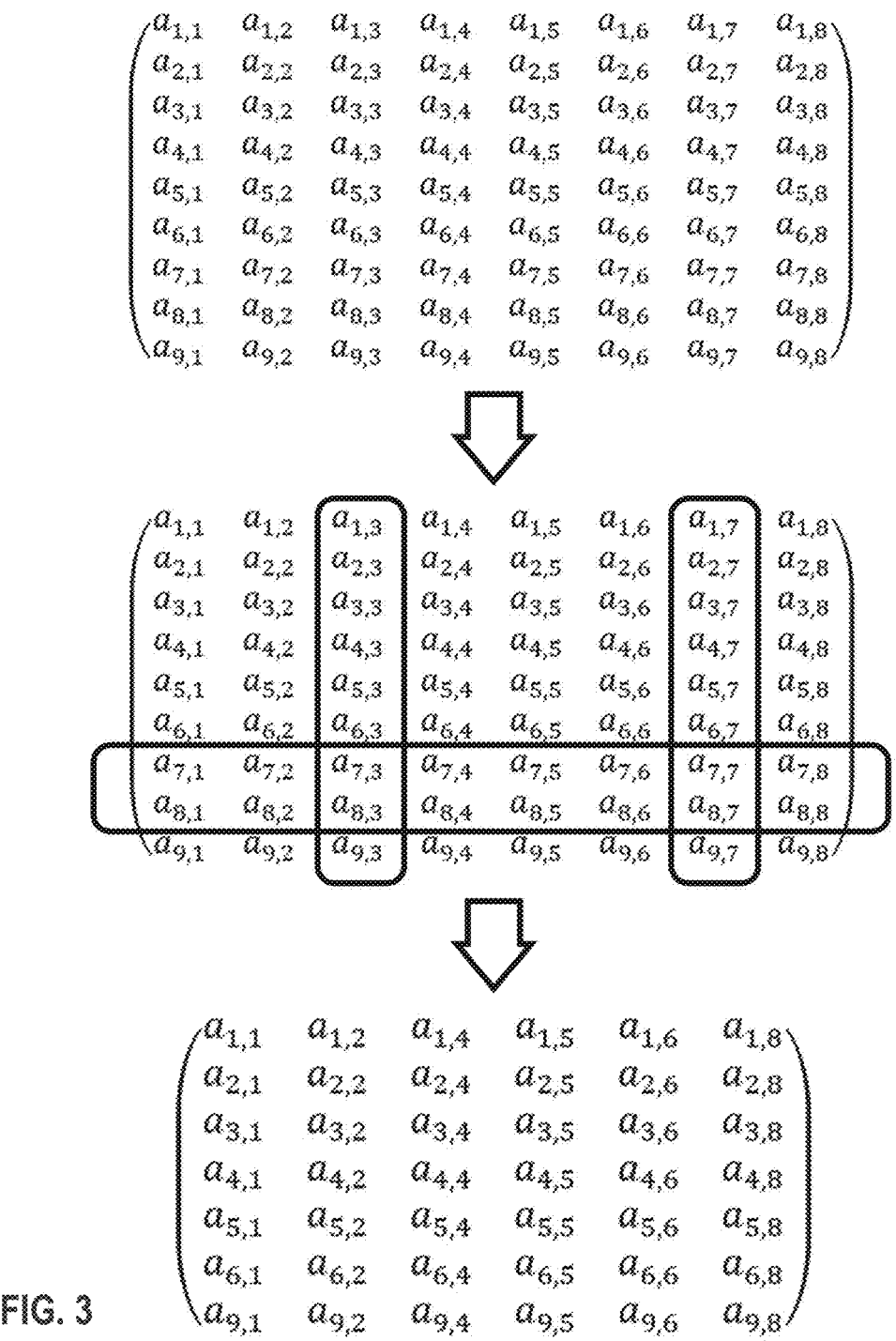
FIG. 3 depicts an example of a technique for reducing the storage size of a deep neural network through removal of values in a weight matrix.

FIG. 3 depicts an example of a technique for reducing the storage size of a deep neural network through removal of values in a weight matrix. FIG. 3 is a graphical depiction of the process of narrowing down the size of a matrix by removing rows and columns from the matrix. The matrix of FIG. 3 is a 9×8 matrix. In FIG. 3, columns 3 and 7 and rows 7 and 8 are identified for removal from the matrix, such as by using the group LASSO regularization techniques described above. The remaining matrix is a 7×6 matrix that includes the unidentified values, but does not include the removed rows and columns.

At step 210, the reduced weight matrix is stored at the server computer. By reducing the size of the weight matrix, the server computer reduces the memory used to store the weight matrix. The server computer additionally reduces the processing power used to multiply the matrix by the training input matrices as well as by future input matrices.

In an embodiment, the server computer retrains the deep neural network in response to removing the one or more weight values from the weight matrix. For example, the server computer may remove the actual rows and/or columns that contain values below a threshold value while training the neural network. As one or more training input matrices may have been used to train the neural network prior to the removal of the rows and/or columns, the outputs from the neural network using one or more of the training input matrices may no longer match the stored corresponding outputs. Thus, the server computer may retrain the neural network using the reduced weight matrix to produce higher accuracy while still maintaining the benefit of the smaller weight matrix.

The server computer may also send the reduced weight matrix to a client computing device for use in processing input data at the client computing device. For example, the client computing device may store an application which utilizes a deep neural network, such as a recommendation engine or a speech analysis program. In an embodiment, the application is provided by the server computer. Thus, the server computer may send, with the application, instructions that cause the client computing device to compute outputs using the reduced weight matrix.

The neural network may be trained at the server computer and then sent to the client computing device. Additionally, using the techniques described herein, the server computer may reduce the size of the neural network by reducing the size of the weight matrix before sending the neural network to the client computing device. The client computing device may then use the neural network in an application executing on the client computing device in order to perform the intended function of the application.

Thus, the computationally expensive steps of training the deep neural network and reducing the size of the weight matrix may be performed at a server computer while the client computing device is able to process new information using the neural network due to the reduced computational cost from the reduced size of the weight matrix. Additionally, by reducing the size of the weight matrix, the server computer is able to send a smaller file to the client computing device, thereby reducing the time it takes to send the data to the client computing device and the amount of memory on the client computing device that is used to store the deep neural network.

4. Replacing Values in a Weight Matrix

In an embodiment, the server computer reduces the size of the weight matrix by reducing the storage size of the values stored within the weight matrix. For example, a weight matrix may include weight values stored as floating-point values. The floating-point values may comprise 32-bit integers. The server computer may reduce the size of each value by replacing the 32-bit integer of the floating point value with a lower bit value, such as an 8-bit integer.

Figure 4:
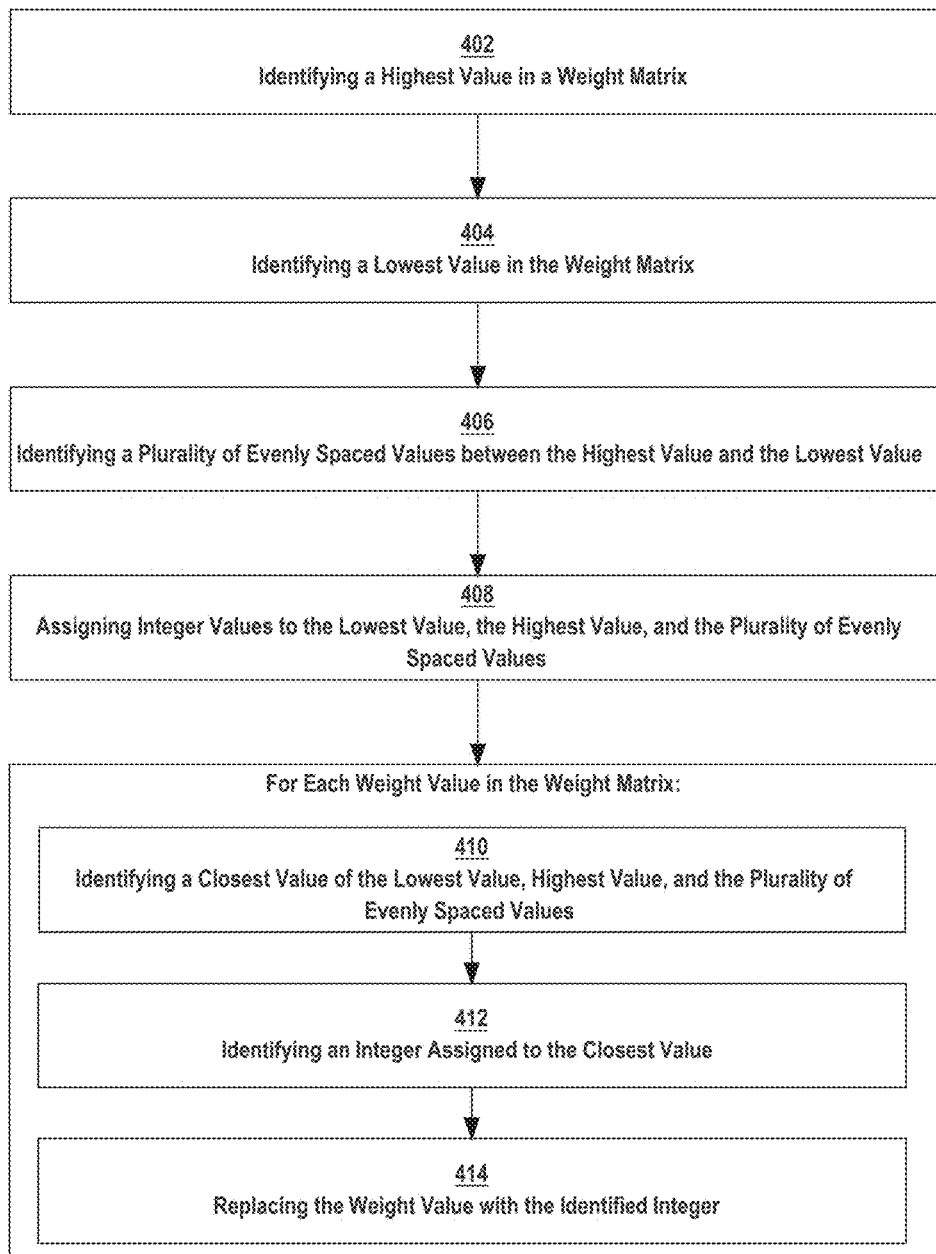
FIG. 4 depicts an example method of a server computer reducing the storage size of a deep neural network.

FIG. 4 depicts an example method of a server computer reducing the storage size of a deep neural network.

At step 402, a highest value in a weight matrix is identified. For example, the server computer may identify the highest weight value in the weight matrix. Additionally or alternatively, the server computer may be programmed or configured to identify a maximum value for a range of values. For example, the server computer may identify the maximum value that is within three standard deviations from the mean value of the matrix. Thus, one or more values in the weight matrix may still be above the identified value.

At step 404, a lowest value in the weight matrix is identified. For example, the server computer may identify the lowest weight value in the weight matrix. Additionally or alternatively, the server computer may be programmed or configured to identify a minimum value for a range of values. For example, the server computer may identify the minimum value that is within three standard deviations from the mean value of the matrix. Thus, one or more values in the weight matrix may still be below the identified value.

At step 406, a plurality of evenly spaced values between the highest value and the lowest value are identified. The server computer may compute a particular number of values that are between the lowest weight value and the highest weight value. For example, if the server computer is converting values into 8-bit integers, then the server computer would have two hundred fifty-six values to identify in total. As the highest value and lowest value will also be converted into 8-bit integers, the server computer may identify two hundred fifty-four values between the lowest value and the highest value.

In order to identify the plurality of evenly spaced values, the server computer may compute an interval spacing comprising a difference between each value and each subsequent value. The server computer may first compute a difference between the highest value and the lowest value. The server computer may divide that difference by one less than the number of total converted values. For example, if the server computer is converting values into 8-bit integers, the server computer may divide the computed difference by two hundred fifty-five. The server computer may then increment the lowest value by the computed quotient to obtain the next lowest value. The server computer may continue the process of incrementing values by the quotient until each value has been identified.

While FIG. 4 describes using evenly spaced values, in other embodiments, the values may not be evenly spaced. For example, the server computer may round the values to a fixed number of significant digits. Thus, while the selected values may be relatively evenly spaced, the selected values may not be completely evenly spaced. Additionally or alternatively, the server computer may select values in between the lowest and highest using a different metric, such as by using percentages of a normal distribution. For example, the server computer may select as a spacing a percentage of the normal distribution computed as the difference between the percentage of the top value and the percentage of the bottom value divided by one less than the number of values to be identified. Thus, if the top and bottom values are at three standard deviations from the mean, then the difference between the two would be 99.4%. Using 8-bit integers, that value may be divided by two hundred fifty-five to determine the percent spacing between each identified value.

The server computer may also select values from the weight matrix instead of computing values between the highest value and the lowest value. One method of selecting values from the matrix may be to identify a number of values in the matrix and divide the number of values in the matrix by one less than the number of values to be identified. The resulting number may be rounded to an integer. The integer may then be used to identify the next value to select from the weight matrix. For example, if the integer is five, then the server computer may select the lowest value, the sixth lowest value, the eleventh lowest value, and so on until the server has selected the requisite number of values from the matrix.

At step 408, integer values are assigned to the lowest value, the highest value, and the plurality of evenly spaced values. The server computer may map the identified values to a plurality of integers. In the examples described above using 8-bit integers, the identified values may be mapped to integers from zero to two hundred fifty-five. Thus, the lowest identified value may be mapped to zero, the second lowest may be mapped to one, the second highest may be mapped to two hundred fifty-four, and the highest may be mapped to two hundred fifty-five. the server computer may store data identifying each identified value and its mapped integer values.

The weight matrix may then be reduced in size by replacing each weight value with an integer value. For example, steps 410-414 may be performed for each weight value in the weight matrix.

At step 410, a closest value of the lowest value, highest value, and the plurality of evenly spaced values is identified. For example, the server computer may select a first value in the weight matrix. The server computer may search through the previously identified values for the highest value that is lower than the selected value and the lowest value that is greater than the selected value. The server computer may then determine which of the two values is closest to the selected value, such as by comparing the absolute values of the differences between the two previously identified values and the selected value.

At step 412, an integer assigned to the closest value is identified. For example, the server computer may identify, in the stored data, the integer that was assigned to the closest value. As an example, assume that the value of 4.5 was assigned to the integer 0 and the value of 6.5 was assigned to the integer of 1. When the server computer selects a value of 5.18796, the server computer will identify the value of 4.5 as the closest value of the stored values. The server computer then identifies data, in storage, indicating that the value of 4.5 was assigned to the integer 0. If the server later selects a value of 6.10295, the server computer will identify the value of 6.5 as the closest value of the stored values. The server computer then identifies data, in storage, indicating that the value of 6.5 was assigned to the integer 1.

At step 414, the weight value is replaced with the identified integer. The server computer may replace the value in the weight matrix with the assigned integer value. In an embodiment, the server computer generates a new matrix of values using the assigned integers in place of the prior weight values. The new matrix of values may be configured to store data values of a particular size. For example, the new matrix may be configured to store 8-bit integers instead of 32-bit integers. Referring to the above example, the server computer may replace the value of 5.18796 with 0 and the value of 6.10295 with the value of 1.

Figure 5:
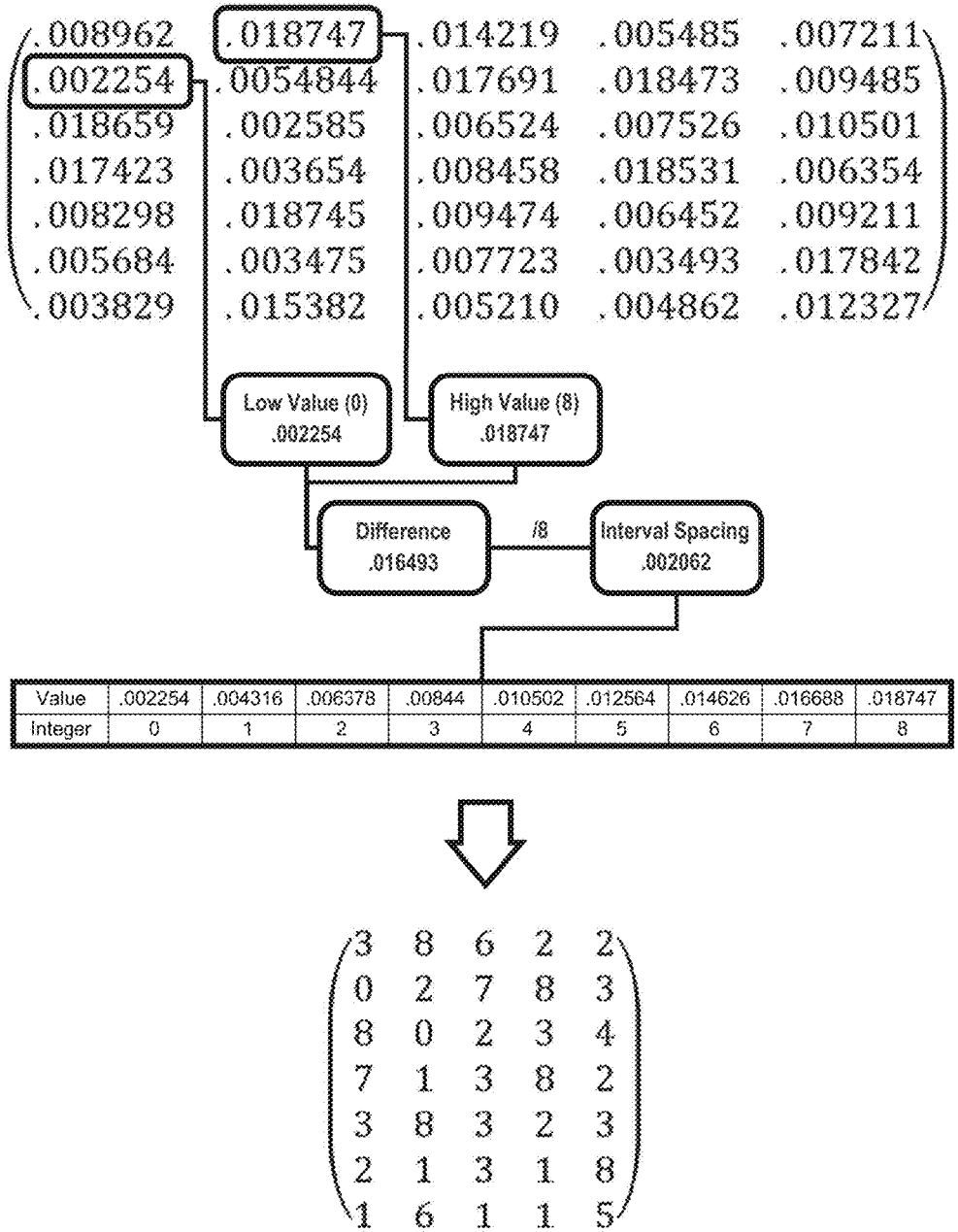
FIG. 5 depicts an example of a technique for reducing the storage size of a deep neural network through replacement of values in a weight matrix.

FIG. 5 depicts an example of a technique for reducing the storage size of a deep neural network through replacement of values in a weight matrix. For the purpose of demonstrating a clear example, FIG. 5 depicts only nine integer values. In other embodiments, a larger or smaller number of integer values may be used. For example, the server computer may use 256 integer values for storage of 8-bit values.

The matrix of FIG. 5 includes a plurality of weight values, each of which comprising six digits. While the values of the matrix of FIG. 5 are depicted in decimal notation, the values may be stored using different types of notation, such as floating point values. The server computer identifies, in the weight matrix, a lowest value of 0.002254 and a highest value of 0.018747. The server computer computes the difference between the two values as 0.016493. The server computer then computes the interval spacing by dividing the difference by eight—one less than the number total number of integers. The resultant spacing is computed as 0.002062.

The server computer stores a table of values mapping integer values to weight values. The low value of 0.002254 is mapped to the integer 0 while the high value of 0.018747 is mapped to the integer of 8. The values are evenly spaced by 0.002062. Thus, the difference between the first value and the second value is the same as the difference between the fourth value and the fifth value. The table of values is then used to generate a new weight matrix of integers instead of larger values. For example, the first value of the weight matrix, 0.008962 is closest in magnitude to the stored value of 0.00846 from the table. The stored value of 0.00846 is assigned the integer of 3. Thus, the first value in the matrix is replaced by the integer 3.

The newly generated matrix may be referred to as a quantized weight matrix. By generating the quantized weight matrix, the server computer reduces the memory used to store the weight matrix, the data usage for transmitting the weight matrix, and the computational cost for computing outputs using the weight matrix. When the server computer receives additional inputs, the server computer may use the quantized matrix to compute outputs. Additionally or alternatively, the server may replace the integers with the values to which the integers were assigned prior to performing a computation. This method preserves the form of the weight matrix while reducing the memory used to store the weight matrix.

The server computer may send the quantized weight matrix as part of a deep neural network to a client computing device. The client computing device may then use the quantized weight matrix in an application executing on the client computing device in order to perform the intended function of the application. For example, the client computing device may store an application that utilizes a neural network to produce an output. In an embodiment, the application is provided by the server computer. Thus, the server computer may send, with the application, instructions that cause the client computing device to compute outputs using the quantized weight matrix.

In an embodiment, the server computer additionally sends to the client computing device data identifying the values to which each integer is assigned. The server computer may send additional instructions to the client computing device which, when executed, cause the client computing device to use the quantized weight matrix as part of the deep neural network and/or convert the quantized weight matrix back to the prior value types by replacing the integers with their associated values. In an embodiment, the client computing device determines whether to use the quantized weight matrix or a converted quantized weight matrix based on the capabilities of the client computing device. For example, the application executing on the client computing device may identify the processing power of the client computing device. If the processing power is above a particular threshold, the client computing device may convert the integers to weight values prior to performing a computation. If the processing power is below the particular threshold, the client computing device may use the quantized weight matrix.

In an embodiment, the server computer additionally encodes the quantized weight matrix before sending the weight matrix to the client computing device. Because the values in the quantized weight matrix each take up the same amount of memory, the weight matrix becomes easier to encode. For example, if the values are replaced with 8-bit integers, the integer values can be encoded to further reduced the size of the weight matrix. The client computing device may then decode the weight matrix using instructions sent by the server computer.

5. Benefits of Certain Embodiments

The methods described herein may be used on their own and/or combined. For example, in a first embodiment, a server computer performs the matrix reduction techniques described herein without performing the quantization techniques. In a second embodiment, the server computer performs the quantization techniques described herein without performing the matrix reduction techniques. In a third embodiment, the server computer performs both the matrix reduction techniques and the quantization techniques described herein. As both techniques reduce memory usage in a different manner, the techniques may be used independently of each other.

The techniques described herein reduce memory usage of computing devices storing neural networks, data usage in transmission of neural networks, and computational cost of computing outputs using the neural network. Thus, a server computing device and a client computing device may benefit from the techniques described herein. A client computing device which receives a reduced size neural network may achieve similar performance for a large neural network while reducing the cost of running the neural network, downloading the neural network, and retrieving the weight matrices from storage. Even a server computer that does not send reduced neural networks to client computing devices may benefit by being able to compute outputs with neural networks faster and more efficiently.

Additionally, by using matrices of a reduced size, a server computer may process inputs faster. For example, a server computer may be able to process video input by computing outputs for each frame of the video. Where processing video input is usually infeasible due to the larger amount of data and the computation expense of computing outputs for each image, processing video output becomes more feasible as the cost of computing each individual output is reduced.

Speeding up the inference of trained networks in this manner yields several real-world benefits. One such example is the ability to quickly determine characteristics about a person given their face. The rise of low-powered embedded computing devices such as the Raspberry Pi and NVIDIA Jetson line, along with the growth in popularity of mobile phones, have allowed smart devices to become ubiquitous in daily life. In conjunction with this, state-of-the-art developments in the technology of deep convolutional neural networks have allowed powerful insights from just the image of a person's face, allowing the determination of his or her gender, approximate age, and even identity. The problem arises when deploying these network architectures in the real-world, as without the backing of a powerful server, the popular network architectures such as VGG-16 and GoogLeNet cannot process images and gather these insights in real-time. With the invention described here, one could develop a powerful security system with just a low-cost embedded computation device and camera, by feeding a video stream from the camera in real time on a trained convolutional neural network, whose size has been reduced with this invention, to quickly identify passing subjects and perform the appropriate actions if someone "blacklisted" is spotted. The invention would allow a previously hefty network architecture to run on a low-power embedded computing device in a situation where sending the camera feed to an external server for network inference is not possible due to latency and the size of the data. Furthermore, one additional application involves the use of such technology in the deployment of deep neural networks in brick-and-mortar retail stores. With corporations looking to increasingly target users online for advertising, they have little such means to do so offline, often resulting in advertisements that cannot change from person to person. Instead, with a screen, camera, and low-power embedded computing device, a store could create an ad that changes depending on the age and gender of the person standing in front of the display. Currently, inference of deep neural network architectures without a powerful server backend is too slow to generate any useful data for such an application. Additionally, sending the live camera feed to a server will be difficult as brick-and-mortar retail often do not have a reliable WiFi connection, and using cellular data would result in a costly bill, and the high network latencies incurred may not be acceptable. Instead, reducing the size of a network with this invention would allow for the deployment of a trained deep network on a low-power computing device that can make these inferences regarding a person's age and gender in real-time, dynamically changing the content of the advertisement and performing superior targeted advertising even in an offline context.

6. Hardware Overview

According to one embodiment, the techniques described herein are implemented by one or more special-purpose computing devices. The special-purpose computing devices may be hardwired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
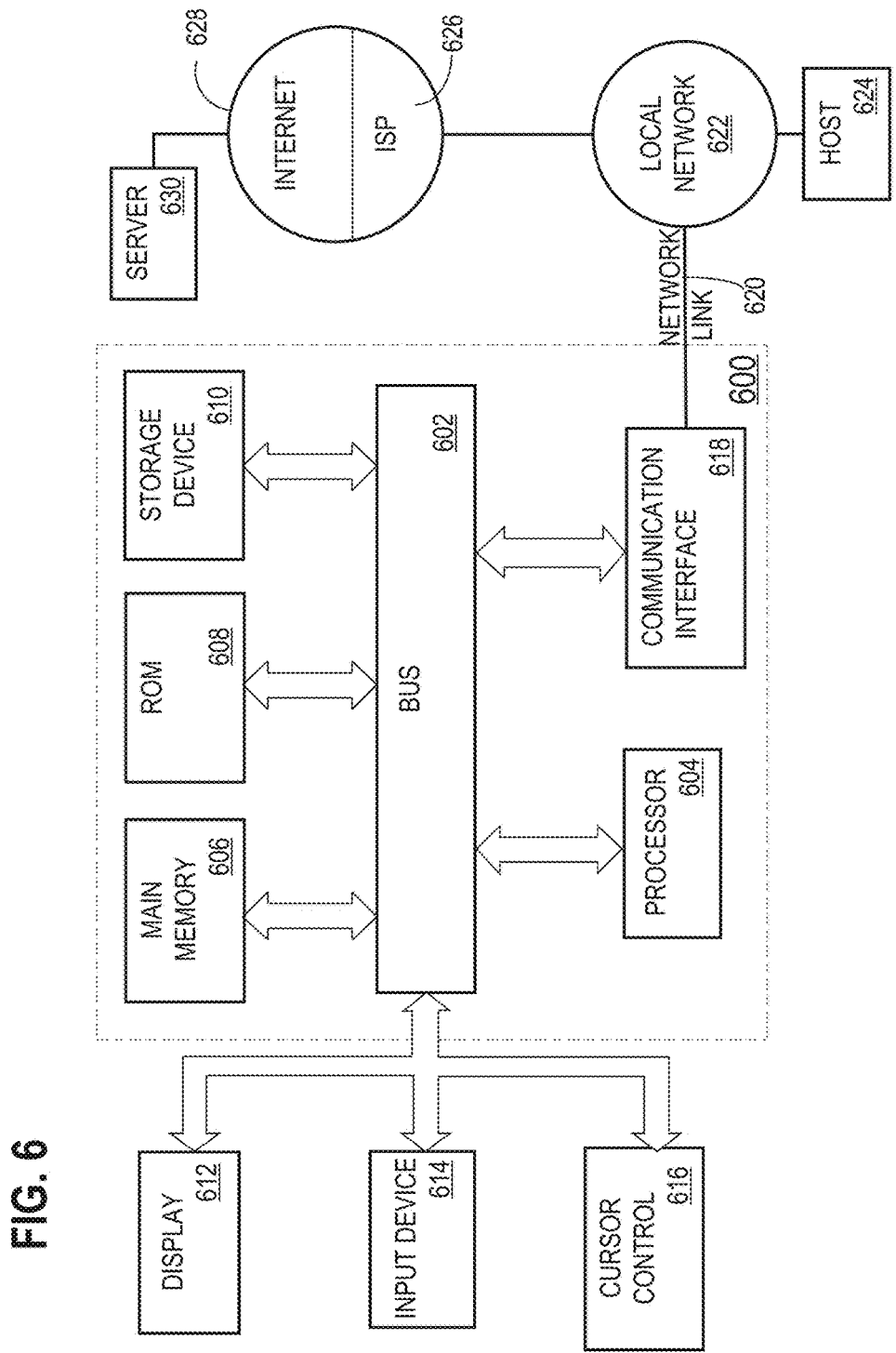
FIG. 6 is a block diagram that illustrates a computer system 600 upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infrared data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As one example implementation, the techniques disclosed herein may be used in a low-power computer comprising a central processing unit; one or more non-transitory digital data storage media coupled to the central processing unit and storing: a trained reduced size deep neural network that has been configured using a server computer, storing a plurality of training datasets, each of which comprising a plurality of training input matrices and a plurality of corresponding outputs; using the server computer, initiating training of a deep neural network using the plurality of training input matrices, a weight matrix, and the plurality of corresponding outputs; while performing the training of the deep neural network, identifying one or more weight values of the weight matrix for removal; removing the one or more weight values from the weight matrix to generate a reduced weight matrix; storing the reduced weight matrix with the deep neural network. The storage media may comprise one or more sequences of instructions which when executed using the central processing unit cause performing: obtaining a digital image from a digital video frame; identifying a face that appears in the digital image; performing a responsive action based on identifying the face that appears in the digital image.

In one aspect, such a low-power computer may further comprising sequences of instructions which when executed cause transmitting a security notification signal as the responsive action. In another aspect, the low-power computer may comprise a computer display output interface; sequences of instructions which when executed cause determining one or more items of demographic data based upon the face that has been identified in the digital image, and selecting and causing displaying a video advertisement based upon the demographic data, as the responsive action, on a computer display device via the computer display output interface.

In yet another aspect, the low-power computer may further comprise sequences of instructions which when executed cause determining an age value and a gender value as the one or more items of demographic data based upon the face that has been identified in the digital image. In various embodiments, the low-power computer may comprise any of a RASPBERRY PI computer, a tablet computer, a computer based on an ARM processor, or a mobile cellular radiotelephone.

In still another aspect, the low-power computer may comprise a video camera that is coupled to the central processing unit to provide the digital video frame.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
using a server computer, storing a plurality of training datasets, each of which comprising a plurality of training input matrices and a plurality of corresponding outputs;
using the server computer, initiating training of a deep neural network using the plurality of training input matrices, a weight matrix, and the plurality of corresponding outputs;
while performing the training of the deep neural network, identifying one or more weight values of the weight matrix for removal;
removing the one or more weight values from the weight matrix to generate a reduced weight matrix;
identifying, in the reduced weight matrix, a first weight value and a second weight value;
identifying a plurality of values between the first weight value and the second weight value;
assigning different integer values to each of the first weight value, the second weight value, and the plurality of values;
generating a quantized weight matrix by performing, for each weight value of the reduced weight matrix;
identifying a particular value of the first weight value, the second weight value, and the plurality of values that is closest in magnitude to the weight value;
identifying a particular integer assigned to the particular value;
replacing the weight value with the particular integer;
storing the reduced weight matrix with the deep neural network.

2. The method of claim 1:
wherein the identified one or more weight values comprise all of the weight values in one or more rows of the weight matrix;
wherein removing the one or more weight values from the weight matrix comprises removing the one or more rows from the weight matrix.

3. The method of claim 1:
wherein the identified one or more weight values comprise all of the weight values in one or more columns of the weight matrix;
wherein removing the one or more weight values from the weight matrix comprises removing the one or more columns from the weight matrix.

4. The method of claim 1, further comprising:
receiving, at the server computer, a particular input matrix;
using the deep neural network, computing an output using the particular input matrix and the reduced weight matrix.

5. The method of claim 1, further comprising:
sending, to a client computing device, the deep neural network and the reduced weight matrix;
sending, to the client computing device, instructions which, when executed by the client computing device, cause the client computing device to perform:
in response to receiving a particular input matrix, using the deep neural network, computing an output using the particular input matrix and the reduced weight matrix.

6. The method of claim 1, further comprising, in response to generating the reduced weight matrix, retraining the deep neural network using the training input matrices and the reduced weight matrix.

7. The method of claim 1, further comprising:
encoding the quantized weight matrix;
sending the encoded quantized weight matrix to a client computing device.

8. The method of claim 1, further comprising:
sending the quantized weight matrix to a client computing device;
sending, to the client computing device, instructions which, when executed by the client computing device, cause the client computing device to perform:
for each integer in the quantized weight matrix:
identifying a value to which the integer was assigned;
replacing the integer with the identified value.

9. The method of claim 1, further comprising:
sending the quantized weight matrix to a client computing device;
sending, to the client computing device, instructions which, when executed by the client computing device, cause the client computing device to perform:
in response to receiving a particular input matrix, using the quantized weight matrix and the deep neural network to compute an output from the particular input matrix.

10. A system comprising:
one or more processors;
a memory storing instructions which, when executed by the one or more processors, cause performance of:
storing a plurality of training datasets, each of which comprising a plurality of training input matrices and a plurality of corresponding outputs;
initiating training of a deep neural network using the plurality of training input matrices, a weight matrix, and the plurality of corresponding outputs;
while performing the training of the deep neural network, identifying one or more weight values of the weight matrix for removal;
removing the one or more weight values from the weight matrix to generate a reduced weight matrix;
identifying, in the reduced weight matrix, a first weight value and a second weight value;
identifying a plurality of values between the first weight value and the second weight value;
assigning different integer values to each of the first weight value, the second weight value, and the plurality of values;
generating a quantized weight matrix by performing, for each weight value of the reduced weight matrix:
identifying a particular value of the first weight value, the second weight value, and the plurality of values that is closest in magnitude to the weight value;
identifying a particular integer assigned to the particular value;
replacing the weight value with the particular integer;
storing the reduced weight matrix with the deep neural network.

11. The system of claim 10:
wherein the identified one or more weight values comprise all of the weight values in one or more rows of the weight matrix;
wherein removing the one or more weight values from the weight matrix comprises removing the one or more rows from the weight matrix.

12. The system of claim 10:
wherein the identified one or more weight values comprise all of the weight values in one or more columns of the weight matrix;
wherein removing the one or more weight values from the weight matrix comprises removing the one or more columns from the weight matrix.

13. The system of claim 10, wherein the instructions, when executed by the one or more processors, further cause performance of:
receiving a particular input matrix;
using the deep neural network, computing an output using the particular input matrix and the reduced weight matrix.

14. The system of claim 10, wherein the instruction, when executed by the one or more processors, further cause performance of:
sending, to a client computing device, the deep neural network and the reduced weight matrix;
sending, to the client computing device, instructions which, when executed by the client computing device, cause the client computing device to perform:
in response to receiving a particular input matrix, using the deep neural network, computing an output using the particular input matrix and the reduced weight matrix.

15. The system of claim 10, wherein the instructions, when executed by the one or more processors, further cause performance of, in response to generating the reduced weight matrix, retraining the deep neural network using the training input matrices and the reduced weight matrix.

16. The system of claim 10, wherein the instructions, when executed by the one or more processors, further cause performance of:
encoding the quantized weight matrix;
sending the encoded quantized weight matrix to a client computing device.

17. The system of claim 10, wherein the instructions, when executed by the one or more processors, further cause performance of:
sending the quantized weight matrix to a client computing device;
sending, to the client computing device, instructions which, when executed by the client computing device, cause the client computing device to perform:
for each integer in the quantized weight matrix:
identifying a value to which the integer was assigned;
replacing the integer with the identified value.

18. The system of claim 10, wherein the instructions, when executed by the one or more processors, further cause performance of:

sending the quantized weight matrix to a client computing device;

sending, to the client computing device, instructions which, when executed by the client computing device, cause the client computing device to perform:

in response to receiving a particular input matrix, using the quantized weight matrix and the deep neural network to compute an output from the particular input matrix.

* * * * *